Patented July 3, 1923.

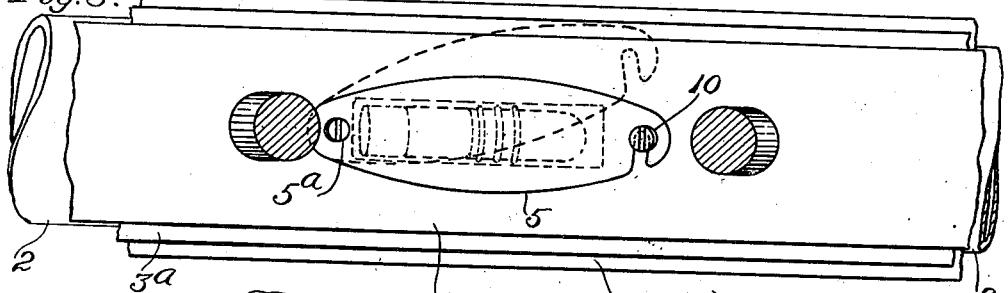
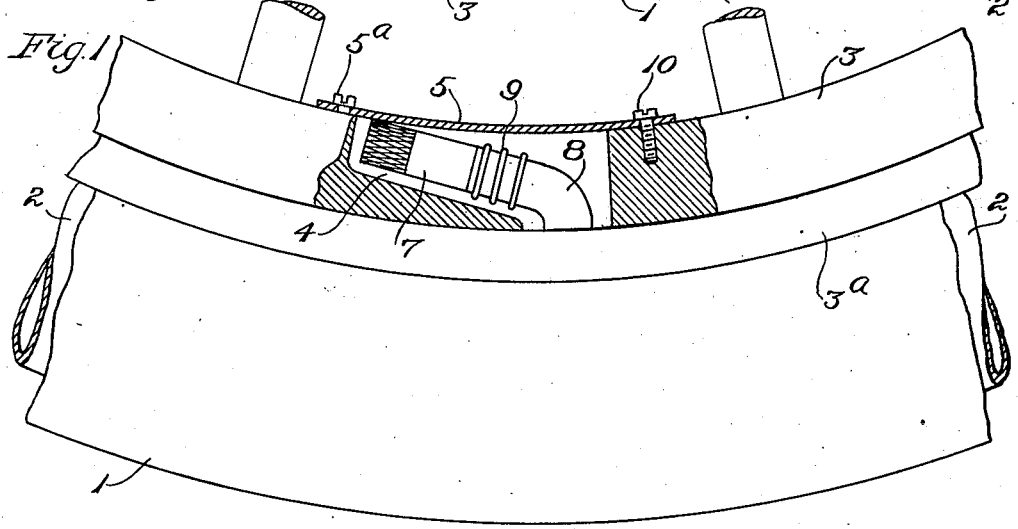
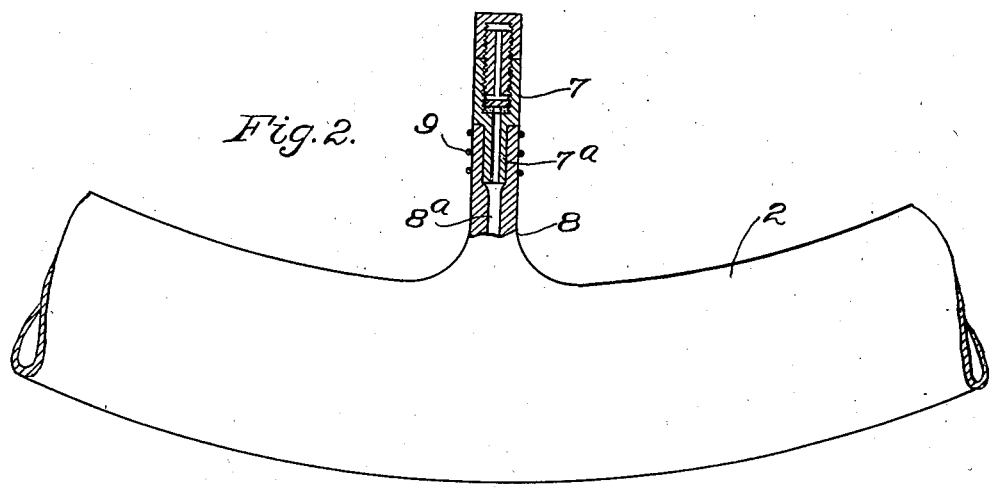

1,460,753

UNITED STATES PATENT OFFICE.

PATRICK J. GRIFFIN, OF DORCHESTER, MASSACHUSETTS.

PNEUMATIC-TIRE WHEEL.

Application filed December 1, 1921. Serial No. 519,260.

*To all whom it may concern:*

Be it known that I, PATRICK J. GRIFFIN, a citizen of the United States, residing at Dorchester, Boston, in the county of Suffolk, State of Massachusetts, have invented a certain new and useful Improvement in Pneumatic-Tire Wheels, of which the following is a specification, reference being had therein to the accompanying drawings.

My invention makes provision for enclosing, concealing, and protecting the air-valve which is employed in connection with the inflatable tire-member of a pneumatic-tire wheel.

In general practice, the air-valve of the inner tube of a pneumatic tire is rigid or inflexible throughout its entire length, and is attached by one end thereof directly to the wall of the inner tube. It extends inward through holes in the rim and adjacent felloe of the wheel on which such tire is mounted, and projects radially inward toward the center of the wheel from the inner side of the said felloe. The inwardly projecting portion of the valve is exposed to injury. It accumulates more or less dust or mud, which may enter into its passageway. This construction and arrangement are objectionable for these and various other reasons.

In accordance with my invention I provide in a wheel felloe a chamber of sufficient dimensions to accommodate the air-valve when the latter is bent or turned down into the said chamber, and I connect the air-valve with the pneumatic tube by a flexible connection which permits the valve to be bent over and turned down within the chamber in question. I provide a movable cover which can be placed in position over the chamber so as to close the latter and retain the air-valve therein, thus enclosing, concealing, and protecting the air-valve, thereby guarding it from injury and preventing it from becoming loaded with mud or dust.

An embodiment of the invention is illustrated in the drawings, in which latter,—

Fig. 1 is a side elevation of a portion of a wheel containing the said embodiment, partly sectional in order that the details of construction may be represented more clearly.

Fig. 2 shows a portion of the inner tube of Fig. 1, and the air-valve in connection therewith, with said air-valve in vertical section.

Fig. 3 is a view in plan of certain of the parts of Fig. 1.

In each of Figs. 1 and 3, a portion of a tire shoe is indicated at 1, a portion of an inner tube is indicated at 2, at $3^a$, Fig. 1, is a portion of a wheel-rim, and a portion of a wheel-felloe is indicated at 3. At 4, Fig. 1, is a chamber such as I form in the wheel-felloe 3 in accordance with my invention, and at 5 is a convenient form of cover for the said chamber. In this instance, the cover is composed of a plate or strip of metal having one end thereof connected by means of a pivot $5^a$ with the felloe at the inner surface of the latter, the said cover being adapted to swing transversely around the said pivot into a position in which it fits over and closes the chamber, or into a position at one side of the chamber, thereby uncovering the latter. The said plate or strip is curved to conform to the concavity of the said inner surface of the felloe. The cover is held in closed position by means of the keeper 10 which projects from the felloe and preferably is constituted by a screw, the swinging extremity of the cover being notched or slotted to fit around the stem of the said screw, below the head of the latter. The screw may be turned to cause its head to clamp the cover against the surface of the felloe in order to hold the cover securely in the closed position.

Referring more particularly to Fig. 2, the air-valve 7 is combined with the inner tube by means of a flexible neck-portion 8 that is formed upon the inner tube and projects therefrom, the said neck-portion having a central passageway $8^a$. The air-valve is formed with a reduced end-portion $7^a$ that is entered into the neck 8 and made fast therein by bindings 9 consisting of turns of wire or wire rings upon the exterior of the end-portion of the neck. The flexibility of the neck enables it to bend so as to permit the valve to be turned down into the chamber, as illustrated in Fig. 1. When the air-valve has been turned down in this manner, the placing of the cover in position over the chamber closes the latter and retains the valve within the chamber. When the cover is moved to one side so as to open up the chamber, the elasticity of the flexible neck-portion 8 will cause the valve to rise out of the chamber into an erect position.

In practice the specific construction may vary more or less.

The invention is adaptable to the wheels and tires of automobiles in general; at the same time, it is especially applicable in connection with those of the lighter makes of cars, such as the Ford, Metz and Dodge cars.

What is claimed as the invention is,—

1. The combination with an inflatable tire-member having an air-valve flexibly connected therewith, of a wheel-felloe, having a chamber into which the said air-valve may be depressed, said chamber having an opening at the inner side of the felloe through which said air valve may project inward of the felloe, and means for retaining the valve depressed within the chamber.

2. The combination with an inflatable tire-member having an air-valve flexibly connected therewith, of a wheel-felloe through which said air-valve projects inward, having a chamber into which the said air-valve may be depressed, and a movable cover for said chamber, by which the depressed air-valve is retained within the latter.

3. The combination with an inflatable tire-member having an air-valve flexibly combined therewith, and a wheel-felloe through which the said valve projects, having a chamber therein into which the valve may be turned down, and a cover for said chamber pivotally connected to said wheel-felloe with capacity to be swung transversely into opened and closed positions respectively, and means for retaining said cover in closed position.

4. The combination with an inflatable tire-member having an air-valve flexibly combined therewith, and a wheel-felloe through which the said valve projects, having a chamber therein into which the valve may be turned down, a cover for said chamber pivotally connected to the wheel-felloe with capacity to be swung transversely into opened and closed positions respectively, said cover having an open slot in its swinging end, and a retainer pin on the wheel-felloe positioned to enter the said slot as the cover swings into closed position.

In testimony whereof I affix my signature in presence of two witnesses.

PATRICK J. GRIFFIN.

Witnesses:
CHAS. F. RANDALL,
ELLEN O. SPRING.